(12) United States Patent
Morris

(10) Patent No.: X8642
(45) Date of Patent: Feb. 25, 1835

(54) CUTTING MEAT

(76) Inventor: John Morris

John Morris. Derby. Connecticut.

Letters Patent.

The Schedule referred to in these Letters Patent and making part of the same containing a description in the words of the said John Morris himself of his improvement in a Machine called a horizontal & transverse cutting machine for cutting meat or flesh to be used for food and other soft substances and reducing them to parts or pieces of any required degree of fineness.

To all people to whom these presents shall come. Be it known that I. John Morris of the town of Derby, County of New Haven and state of Connecticut, have invented a new and useful Machine called a Horizontal and transverse cutting Machine for cutting meat or flesh to be used for food, and other soft substances and reducing them to parts or pieces of any required degree of fineness; and that the following is a full & exact description of the operation and construction of the said Machine as invented by me, that is to say. The machine consists of the following parts viz. a shaft, Center and arms. Two beds and knives, Hopper & Bearing with their appropriate fastenings and a case.— 1st The shaft is a round bolt of about one inch diameter and thirty inches long wrought to a point at the lower end, adapted to receive a crank or Gearing at the other and polished smooth— 2d— Center and arms. The center is an upright Cylinder 7 inches long & 2 inches in diameter with a perpendicular hole through it of one inch to admit the shaft. From its bottom 4 arms, possessing each the strength of an inch bar & 8 inches long branch horizontally at right angles, forming when received from the under side 2 diameters of 18 inches in length severed in the middle by the hole in the center and otherwise crossing that center at right angles. These arms may be square or or round but their appearance is improved by flattening the rod the widest part being perpendicular & lessened in thickness & rounded on the top & tapering from the center to the bulb or swell near the extremity. Through this swell in each arm a perpendicular hole is made & a thread therein to admit a screw. 3 The beds and knives.. 1. The outer bed for horizontal knives is a circle of 16 inches diameter and one inch thick at the rim, but is diminished in thickness as the cavity in the middle is approached and on reaching it is reduced on the under side to an edge. the shape of this cavity is such as to fit the inner Bed for the perpendicular knives hereinafter described. Through the outer bed near its outside or rim 4 perpendicular holes are made of 3/4 inch diameter at the distance of 90 degrees or a quarter of the circle from each other. Four flat broad knives or cutters of 1/8 inch in thickness, convex on the outer end to correspond with the rim of the bed and concave on the inner end which is the edge, and so shaped as passing over the edge of the bed on the upper side about one half inch to fit and form the surface of the inner cavity The knives compared with each other are of unequal widths, but each is of uniform width and exactly fitted to fill the space between the Furs: which are flat triangular pieces of different sizes of the same thickness as the knives and placed between them, convex at their outer end or base to correspond with the rim of the bed and their inner end or angle terminating between the knives at the edge of the inner curved opening. These knives and Furs cover the upper surface of the Bed, and while the latter are secured immoveably to the bed by means of screws or rivets both are further fastened by means of a flat circular ring 1/2 inch thick 2 inches wide and 16 inches in diameter placed over them & fixed by means of screws passed partly through a knife & fur or between them. & into the bed. As the knives will require to be removed in order order to be sharpened on turning the screws the ring is
loosened and they are taken out & returned again at pleasure.
The 4 perpendicular holes above mentioned to be made through
the bed should also be made through the Furs. Four round
bars of 3/4 inch diameter and 10 inches long with a screw end
on one end to receive a nut & on the other to fit the thread
in the hole through the arms, are put in through each arm
and the other end inserted through the hole in the outer Bed
Furs & Ring is secured firmly by a nut on the top; and thus
the center & arms and outer bed are connected together ready
to receive the shaft and inner bed. 2. The inner bed for
perpendicular knives occupies the center and nearly fills the
cavity in the outer bed of the Machine. It is a flat plate of the
same thicknefs as the outer bed and its shape is that of a
circle whose diameter by an uniform extension increases
from 2 to 6 inches; or it is a line connecting the ends of succes
sive and contiguous diameters drawn from the same center and
increasing in length by a gradual and uniform ratio from 2 in
inches to 6. In the center is made a hole of one inch diameter
to admit the shaft, near the outer edge of the inner bed small
perpendicular mortices are made of the size of the knives to be
inserted say 3/4 by 1/20 to 1/32 part of an inch, or small grooves
cut perpendicularly on the edge, of the same dimentions may
be used and the knives are fastened firmly in each by
means of a screw passed through them and into the bed:
These knives 13 in number should be 2 inches long a little
crooked or notched under on the fore side and so placed
as that when the Machine is in motion the edge of each
will describe a true circle around the same center and each
should extend above the bed ordinarily from 1/16 to 1/8 inch.
This bed being formed and the knives fixed thereto is put
upon the shaft and lowered down to rest on the top of the
center cylinder, the shaft being firmly fastened in both by a
wedge.

wedge or pin or if preferred by a nut and screw on the shaft, above & below. 4 The Hopper & Bearing is a hollow band or circle 12 inches in diameter on the inside 6 inches deep & from 1/2 inch to one inch thick divided in the middle perpendi= cularly by a diameter or cross bar of the same depth and thickness and with a flange on the outside of 1/2 inches, it is fastened by means of screws to and in the center of the top of the case. A cylinder is formed in the center of the cross bar 2 inches in diameter, which perforated perpendicular= ly to admit the shaft to pass through becomes its upper bea =ring. On the bottom of the case inside and in the center is placed a metallic step fixed in a block of wood on which the bottom of the shaft is to rest and which is to be raised or lowered by means of a screw underneath passing through the case. 5 The case is a square wooden box of sufficient size and height to admit & enclose the machine. The cover or lid to which the hopper is fixed must be so fastened as to admit of being removed that the machine may be taken out when necessary. A small door is also to be made near the bottom on one side of the case. by opening which the cuttings can be drawn out after the operation. In the for= mation of the inner bed care must be taken that it be a little less say 1/16 to 1/8 inch than the cavity formed by the edge of the horizontal knives, so that a space may be left for the cuttings to pass between and drop into the case below when the two beds are nearest to the same level. The 4 Bars connecting the arms and the outer bed may be fastened permanently in the arms & a screw formed on the upper end far enough to reach say one inch below the bed and a nut being placed on it below the bed, will serve to raise or depress it as shall be required while a nut on the top will secure it firmly down. The whole machine may be made of cast or wrought iron or composition metal metal except the knives which must be of Steel and the case which should be of wood. The number of the knives in each bed may be varied as shall be wished and the dimentions of the Machine enlarged or dimi=nished at pleasure according to the power intended to move it. The distance between the outer and inner beds and of course the size of the opening between them may be enlarged or diminished by turning the screws on the Bars in the arms, if at the lower end or the nut below the bed, if on the upper end; the screw below the step having been first employed in case of raising to lower the Machine & in case of lowering, afterwards to raise it up to the under side of the hopper. If coarse cutting is designed this space between the beds will require to be enlarged, that is the outer bed will be raised above the other. but if fine cutting this space will be diminished by low=ering the same down. The perpendicular knives will also admit of a small elevation & depression which will conspire to produce the same result.

The Machine being inserted in the box, the shaft on the step and the hopper & bearing on and fastened down & graduated to the degree of fineness required in the Cuttings, is turned rapidly round by a crank on the top of the shaft, if by hand, or by gearing attached thereto, if by water or other power; and the meat having been cleared from the bone, or other substance designed to be cut reduced to parts or pieces of convenient size & put into the Hopper is cut into shreds by the perpendicular knives and these again cut off at proper lengths by the horizontal ones, drop thro the cavity be=tween the beds into the case below. If very fine cutting is required and one operation is not sufficient, the requisite fineness may be attained by repeating the process.

What I claim as new in this invention is, not the

Case

Case but the machine as arranged, constructed & adapted
to the objects specified. Its advantages are very many and
will readily occur to every intelligent mind. Among those
obvious are the rendering soft and tender the parts of the flesh
of animals naturally hard and dificult of Mastication.
The preserving all the pieces entire and thereby avoiding the
waste of them incident to the most common modes of
preserving and preparing it for food and thus retaining un
=expended the peculiar flavor of each kind. and the facil-
ity offered by this process of applying in stantly at all seasons
to each minute part of it the means of preservation and
seasoning without incurring the danger of putrefaction con-
sequent on the slow action of those means upon large mas-
ses in the present mode of curing them.

In witness whereof I have hereunto set my hand
this nineteenth day of January Anno Domini 1835

Witnesses
Sheldon Canfield Jr
John L. Tomlinson.

John Morris

Exd.
W.C.

(2136 words)

(Granted February 25. 1835)

Drawing

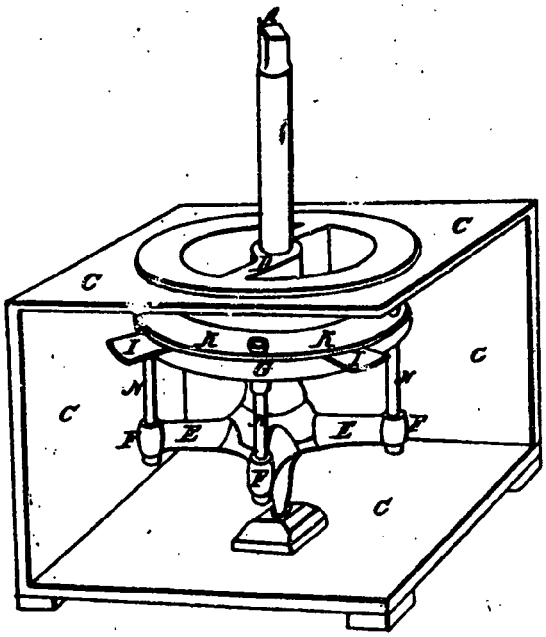
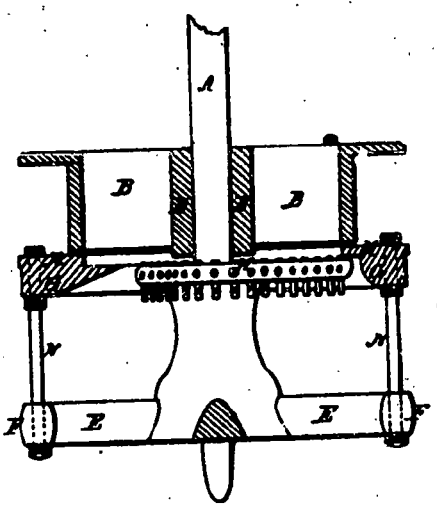
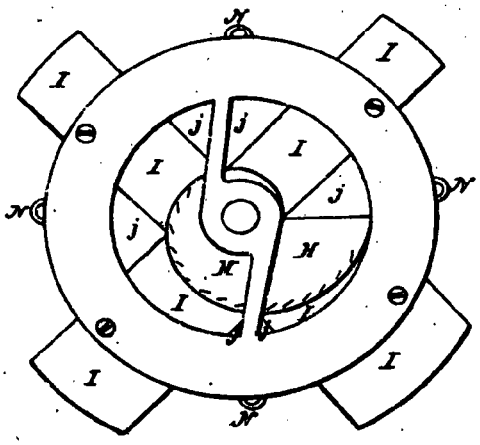

United States Patent
Patent No.: X8642
J. MORRIS.
Meat Cutter.
Patented Feb. 25, 1835.